United States Patent [19]
Akuzawa et al.

[11] Patent Number: 5,546,086
[45] Date of Patent: Aug. 13, 1996

[54] RANGING SENSOR SYSTEM FOR VEHICLE

[75] Inventors: Kenji Akuzawa; Hiroki Matsui; Yasuhiko Fujita, all of Wako, Japan

[73] Assignee: Honda Giken Kogyo Kabushiki Kaisha, Tokyo, Japan

[21] Appl. No.: 237,908

[22] Filed: May 4, 1994

[30] Foreign Application Priority Data

May 12, 1993 [JP] Japan .................. 5-110638

[51] Int. Cl.⁶ ................................. G01S 13/00
[52] U.S. Cl. ................ 342/70; 342/71; 340/435; 340/901; 340/904; 356/3; 356/27
[58] Field of Search ................... 340/435, 901, 340/904; 342/70, 71; 356/3, 27

[56] References Cited

U.S. PATENT DOCUMENTS

| | | | |
|---|---|---|---|
| 4,757,450 | 7/1988 | Etoh | 364/426 |
| 5,227,784 | 7/1993 | Masamori et al. | 340/903 |
| 5,293,162 | 3/1994 | Bachalo | 340/905 |
| 5,314,037 | 5/1994 | Shaw et al. | 180/169 |
| 5,321,407 | 6/1994 | Kikuchi et al. | 342/70 |
| 5,341,344 | 8/1994 | O'Brien et al. | 367/96 |

FOREIGN PATENT DOCUMENTS

| | | |
|---|---|---|
| 3222263 | 2/1983 | Germany . |
| 3616930 | 12/1986 | Germany . |
| 4140716 | 6/1992 | Germany . |
| 4104315 | 8/1992 | Germany . |
| 2139445 | 11/1984 | United Kingdom . |

*Primary Examiner*—J. Woodrow Eldred
*Attorney, Agent, or Firm*—Armstrong, Westerman, Hattori, McLeland & Naughton

[57] ABSTRACT

In a ranging sensor system for a vehicle for calculating a physical data between a subject vehicle and an object on the basis of the time between the transmission of a signal toward the object and the reception of a signal reflected from the object, a first obtained detection data is set as an offset value in an offset value setting circuit. The offset value is subtracted from the detection data in a subtractor, and an output from the subtractor is filtered in a filter circuit. The offset value is added to an output from the filter circuit in an adder to provide a physical data after the filtering. Thus, it is possible to eliminate an error included in detection data, while insuring a responsiveness and a stability.

2 Claims, 4 Drawing Sheets

Time lapsed

Time lapsed

RANGING SENSOR SYSTEM FOR VEHICLE

BACKGROUND OF THE INVENTION

1. Field of the Invention

The present invention relates to a ranging sensor system for a vehicle for calculating physical data between a subject vehicle and an object on the basis of a time between the transmission of a signal toward the obstacle and the reception of a signal reflected from the object.

2. Description of the Related Art

There are conventionally known ranging sensor systems using radar for measuring a distance between a subject vehicle and an object, for example, from Japanese Patent Publication No. 4700/86.

In calculating a physical data, e.g., the distance between the subject vehicle and the object, on the basis of the time between the transmission of the signal toward the obstacle and the reception of the signal reflected from the object, an error is included as a "vibration" in the obtained distance data. Moreover, the distance data to the object is obtained for the first time when the object is located in a range of a measurable distance and a measurable angle. No data is obtained, however, when the object is located in a range of a non-measurable distance or a non-measurable angle. Therefore, the data appears and disappears in a stepped manner, as shown by a solid line in FIG. 4.

Thereupon, if filtering is carried out to eliminate the vibration component of the error, detection data, when obtained for the first time, appears in a stepped manner as described above and hence, the data obtained after filtering of the detection data is varied, and a relatively long time is taken until the data obtained after the filtering converges.

SUMMARY OF THE INVENTION

Accordingly, it is an object of the present invention to provide a ranging sensor system for a vehicle, wherein the error included in the detection data is eliminated, while insuring responsiveness and the stability.

To achieve the above object, according to the present invention, there is provided a ranging sensor system for a vehicle for calculating a physical data between a subject vehicle and an object on the basis of the time between the transmission of a signal toward the object and the reception of a signal reflected from the object, comprising an offset value setting circuit for setting a first obtained detection data as an offset value, a subtractor for subtracting the offset value from the detection data, a filter circuit for filtering an output from the subtractor, and an adder for adding the offset value to an output from the filter circuit to provide the physical data after the filtering.

With the above arrangement, the filter circuit performs filtering on the basis of a first data, and it is merely required to follow only varied components after detection of data. This makes it possible to satisfy the responsiveness and the stability and to eliminate the error.

The above and other objects, features and advantages of the invention will become apparent from the following description of a preferred embodiment taken in conjunction with the accompanying drawings.

DESCRIPTION OF THE PREFERRED EXEMPLARY EMBODIMENT

The present invention will now be described by way of a preferred exemplary embodiment applied to a ranging brake system for a vehicle, as shown in the accompanying drawings.

Figure 1:
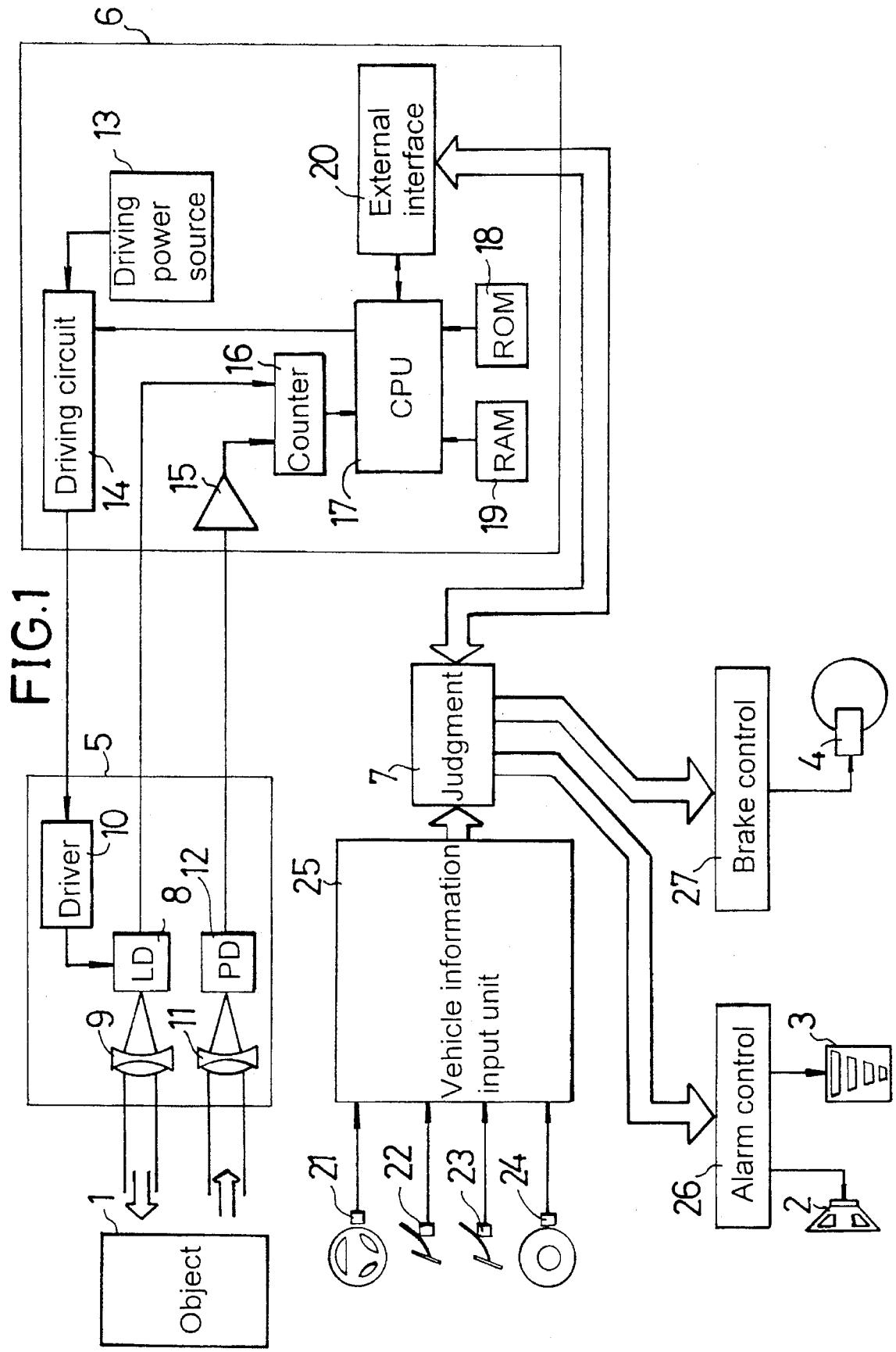
FIG. 1 is a diagram illustrating the entire arrangement of a ranging brake system to which the present invention is applied.

FIG. 1 illustrates a ranging brake system according to a preferred embodiment of the present invention. This ranging brake system controls the operations of an alarming horn 2, an alarm display 3 and a brake 4 by the result of a collision judgment based on a relative speed between a subject vehicle and an object existing in front of the subject vehicle. The ranging brake system includes a laser head 5 mounted on a front portion of the vehicle, an electronic control unit 6 hereinafter "ECU" for controlling the operation of the laser head 5 and calculating physical data, e.g., a distance between the subject vehicle and the object 1 on the basis of a signal from the laser head 5, and a judging unit 7 for calculating a relative speed between the subject vehicle and the object 1 on the basis of the distance determined in the ECU 6 and judging the collision on the basis of the relative speed, the distance and the like.

The laser head 5 includes a laser diode 8 for transmitting a signal forwardly, a lens 9 for focusing the signal from the laser diode 8 to apply it toward the object 1, a driver circuit 10 for driving the laser diode 8, a lens 11 for receiving the signal reflected from the object 1, and a photo-diode 12 for receiving the signal focused by the lens 11.

The ECU 6 includes a power source 13 for driving the laser diode 8, a driving circuit 14 for switching the connection and disconnection of the driver circuit 10 to and from the driving power source 13 for controlling the operation of the driver circuit 10, an amplifier 15 for amplifying the signal from the photo-diode 12 receiving the signal reflected from the object 1, a counter 16 for counting the time between transmission of the signal by the laser diode 8 and the reception of the signal by the photo-diode 12, a central processing circuit hereinafter "CPU" 17 for calculating the distance between the subject vehicle and the object 1 on the basis of the time determined in the counter 16 and controlling the operation of the driving circuit 14, a read-only memory (ROM) 18 for storing various calculating programs which are carried out in the CPU 17, a random access memory (RAM) 19 for storing results of the calculations in the CPU 17, and an external interface 20 for permitting the transfer of the signal between the judging unit 7 and the CPU 17.

Detection values detected by a steering angle detector 21, a brake operation detector 22, an accelerator operation amount detector 23, a vehicle speed detector 24 and the like are supplied through a vehicle information input unit 25 into the judging unit 7, which is a computer. The operations of the alarming horn 2 and the alarm display 3 are controlled by an alarm control circuit 26. The operation of the brake 4 is controlled by a brake control circuit 27. The judging unit 7 judges the collision of the vehicle against the object 1 on the basis of a distance data obtained in the ECU 6 and an information supplied thereunto from the information input unit 25, and applies a control signal based on the result of the judgment to the alarm control circuit 26 and the brake control circuit 27.

Figure 2:
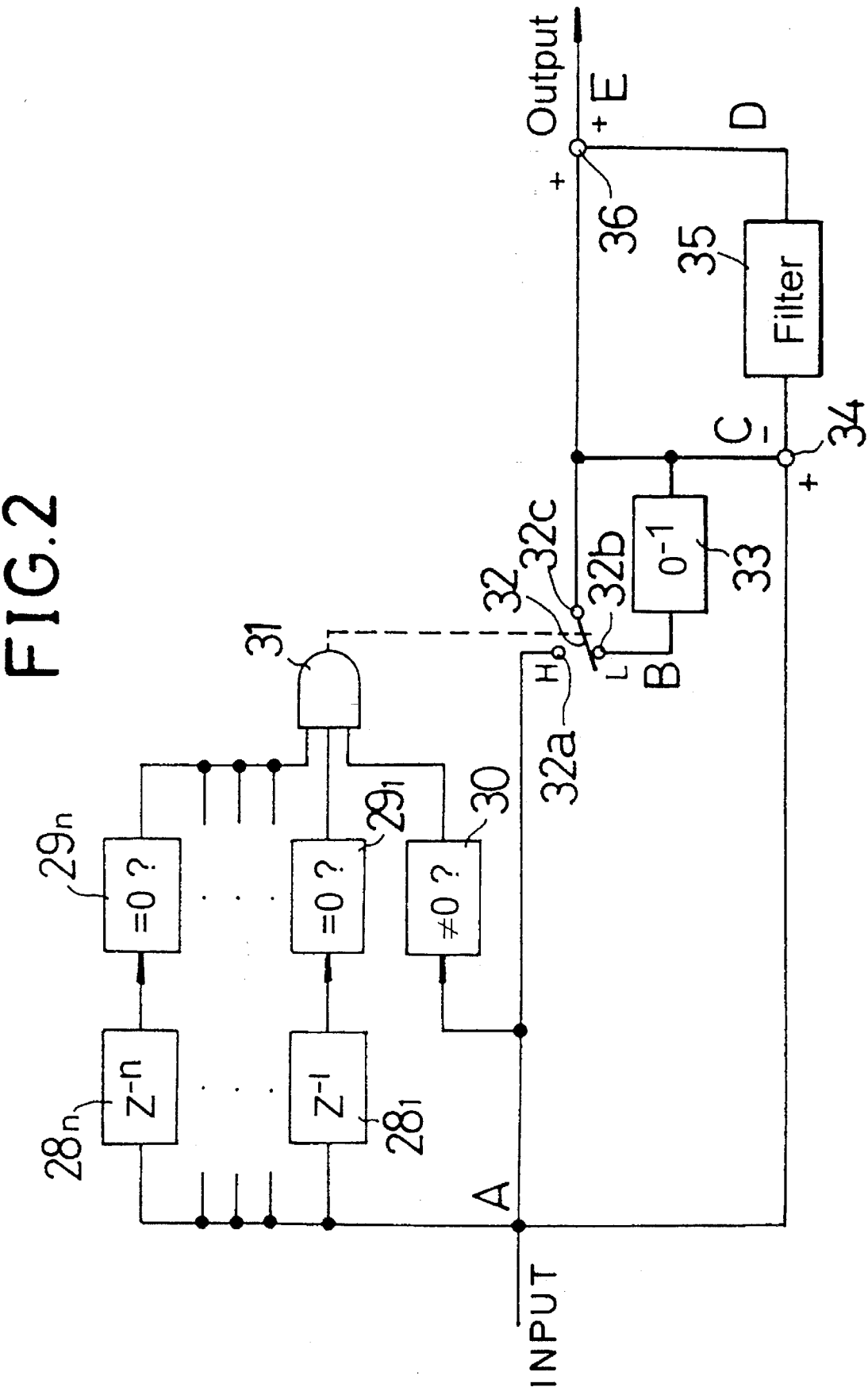
FIG. 2 is a diagram illustrating arrangements of some of the functions of a central processing circuit.

In the ECU 6, the time between the transmission of the signal toward the object 1 and the reception of the signal reflected from the object 1 is determined in the counter 16, and the distance between the subject vehicle and the object 1 is calculated in the CPU 17 on the basis of the time determined in the counter 16. For such a calculation, the CPU 17 has various functions, including an offset value setting circuit 33 for setting a first-determined distance detection data as an offset value $0^{-1}$; a subtractor 34 for subtracting the offset value $0^{-1}$ from continuously-obtained detection data; a filter circuit 35 for filtering an output from the subtractor 34; and an adder 36 for adding the offset value $0^{-1}$ to an output from the filter circuit 35 to provide a filtered distance data, as shown in FIG. 2.

A raw distance data calculated on the basis of the time determined in the counter 16 and an output from the offset value setting circuit 33 are alternately selected in a switch circuit 32. An output from the switch circuit 32 is applied to the offset value setting circuit 33 and to the subtractor 33 and the adder 36. The switch circuit 32 includes an independent contact 32 to which the raw distance data is applied, an independent contact 32b to which the output from the offset value setting circuit 33 is applied, and a common contact 32c commonly connected to the offset value setting circuit 33, the subtractor 34 and the adder 36. The switch circuit 32 is switched over between a state in which the independent contact 32b is in conductive connection with the common contact 32c when an output from an AND gate 31 is a low level, and a state in which the independent contact 32a is in conductive connection with the common contact 32c when the output from the AND gate 31 is a high level.

The applied raw distance data is renewed for every calculating loop, for example, for 100 milliseconds and stored in memory circuits $28_1$ to $28_n$. More specifically, a last raw data $Z^{-1}$ is stored in the memory circuit $28_1$, and a raw data $Z^{-n}$ obtained n-times ago is stored in the memory circuit $28_n$. Here, n is set, for example, at a value of 5 to 10. The raw data $Z^{-n}$ obtained n-times ago is a data obtained 500 msec to 1 sec ago.

Outputs from the memory circuits $28_1$ to $28_n$ are applied to data presence/absence judging circuits $29_1$ to $29_n$, respectively, each of which delivers a high level signal when the corresponding raw distance data $Z^{-1}$ to $Z^{-n}$ has a value of "0"(zero). The raw distance data applied at this time is applied to a data presence/absence judging circuit 30 which delivers a high level signal when the raw distance data applied at this time is other than "0"(zero), i.e., when an effective distance data has been applied at this time.

Outputs from the data presence/absence judging circuits $29_1$ to $29_n$ and 30 are commonly applied to the AND gate 31. Therefore, the AND gate 31 delivers a high level signal when the distance data has been obtained for the first time after a state in which the distance data had not been obtained has been continued a series of n-times. At other times, the output from the AND gate 31 is a low level. Thus, the switch circuit 32 permits the independent contact 32a, to which the inputted raw distance data is applied, to be brought into conductive connection with the common contact 32c only when the distance data has been obtained for the first time after a state in which the distance data has not been obtained has been continued a series of n-times. At other times, the switch circuit 32 permits the independent contact 32b, to which the output from the offset value setting circuit 33 is applied, to be brought into conductive connection with the common contact 32c.

Figure 3:
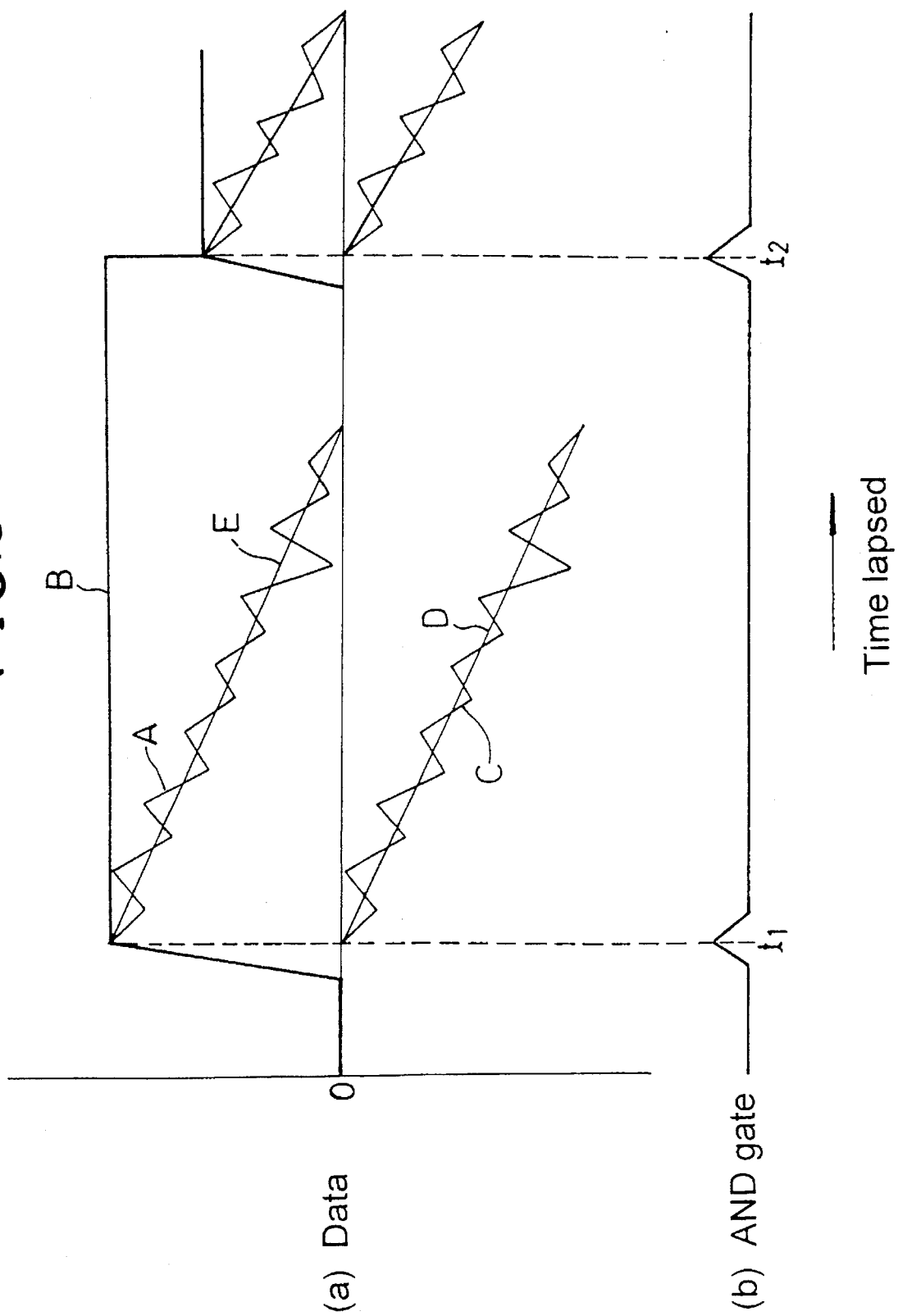
FIG. 3 is a chart of operation timing.

The operation of this embodiment will be described below in connection with FIG. 3. In FIG. 3, reference character A is an applied distance data; reference character B is an output from the offset value setting circuit 33; reference character C is an output from the subtractor 34; reference character D is an output from the filter circuit 35; and reference character E is an output from the adder 36.

When a raw distance data has been obtained for the first time at a time point $t_1$, the switch circuit 32 is brought into a switching mode in which the independent contact 32a is in conductive connection with the common contact 32c, in response to the output from the AND gate 31 becoming a high level. In this switching mode, the raw distance data obtained at this time is applied to the offset value setting circuit 33 where it is set as an offset value $0^{-1}$, and the output from the subtractor 34 is made to be "0"(zero). Thus, the filtering in the filter circuit 35 is started with an input state of "0".

When the distance data is continuously obtained after the time point $t_1$, the low level of the output from the AND gate 31 is sustained during the subsequent calculation, and the switch circuit 32 permits the offset value $0^{-1}$ in the offset value setting circuit 33 to be delivered to the common contact 32c. The offset value setting circuit 33 maintains the offset value $0^{-1}$ which has been set at the time point $t_1$ in such a manner that the offset value $0^{-1}$ is maintained for every calculation loop.

In the adder 36, the offset value $0^{-1}$ is added to the data after being subjected to the filtering which has been started with the input state of "0" in the filter circuit 35, and a resulting value is delivered therefrom.

When a distance data has been obtained again at a time point $t_2$ after passage of the calculations n or more times after the applied distance data has become "0", it is decided that such distance data has been obtained for the first time. Thus, the output from the AND gate 31 is brought into a high level, and the set value in the offset value setting circuit 33 is maintained. Thereafter, the calculation is carried out in the same manner as described above.

Figure 4:
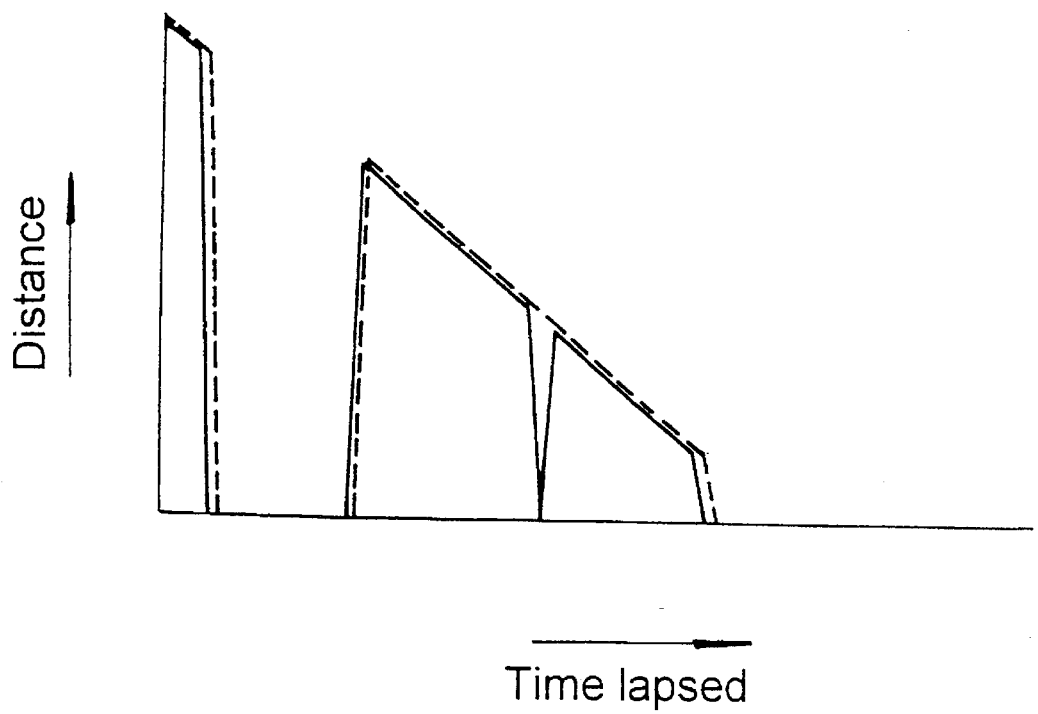
FIG. 4 is a diagram illustrating a variation in data after filtering in accordance with a variation in raw distance data.
Figure 5:
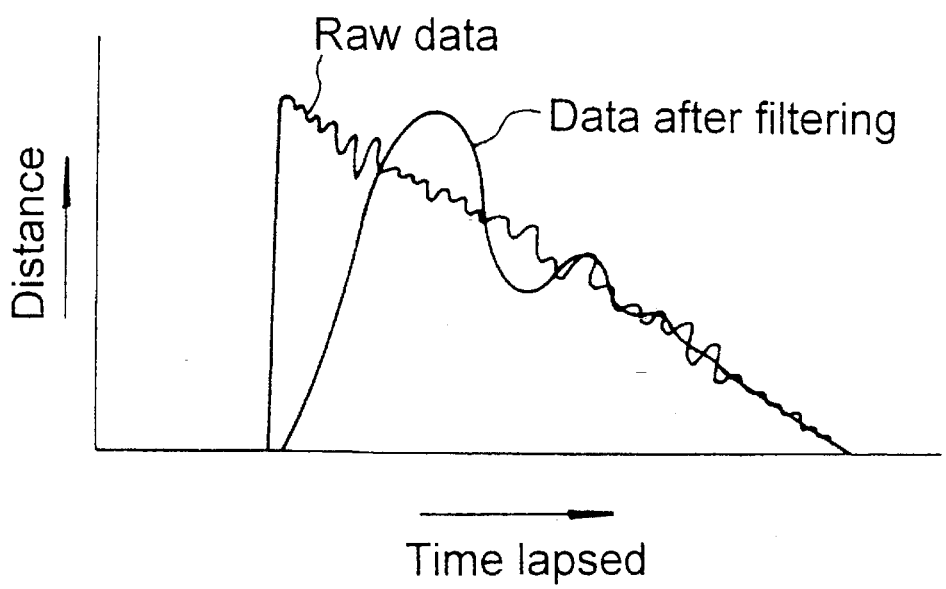
FIG. 5 is a diagram illustrating characteristics of a prior art filtering process.

When a distance data has been obtained again after passage of the calculations less than n-times after the applied distance data has become "0" it is not decided that such distance data has been obtained for the first time, and the offset value $0^{-1}$ is not maintained. Therefore, when the distance data is lost for any reason for an extremely short time (e.g., for 500 msec to 1 sec or less), as shown by a solid line in FIG. 4, the offset value $0^{-1}$ remains non-maintained. Thus, the arrangement is such that when the loss of data for a given time is filled up on the basis of the past data, the distance data after being filtered is delivered in such a manner as to compensate for such a lost portion, as shown by a dashed line in FIG. 4.

In this manner, it is determined that a detection data is obtained for the first time when the data has been detected after a state in which there is no detection value has been continued for a given time of 500 msec to 1 sec, and the detection raw data at such time is set as the offset value $0^{-1}$. The offset value $0^{-1}$ is subtracted from the detection data in the subtractor 34, and the output from the subtractor 34 is processed in the filter circuit 35. Therefore, the filtering in the filter circuit 35 is started with the state of the input "0", and hence it is required to follow only varied components after detection of the data. Moreover, the offset value is added to the output from the filter circuit 35 in the adder 36 to provide a filtered distance data. This makes it possible to satisfy both responsiveness and stability requirements and to eliminate error.

Although the preferred exemplary embodiment of the present invention has been described in detail, it will be understood that the present invention is not limited to the above-described embodiment, and various modifications in design can be made without departing from the spirit and scope of the invention defined in the claims.

For example, the present invention is applicable to a system designed such that in place of the distance data, a time data and a relative speed are obtained as physical data. In addition, in a system in which physical data in the longitudinal and lateral directions of the vehicle body are detected, both of the physical data in those directions may be use a physical data. Although the arrangement of the system according to the present invention has been described as being included in the CPU 17 in the ECU 6 in the above-described embodiment, it may be included in the judging unit 7 comprising the computer. Further, although the first detection of data is "the detection of data after continuation of the state free from detection of data for the given time" in the above-described embodiment, the arrangement may be such that the loss of data for a given time may be supplemented on the basis of the past data, and the data may be detected for the first time, "when the last value of data is "0" and there is a data detected this time after the supplement".

What is claimed is:

1. A ranging sensor system for a vehicle for calculating a physical data between a subject vehicle and an object on the basis of the time between the transmission of a signal toward the object and the reception of a signal reflected from the object, comprising:

detection means for detecting data representing a physical relationship between the subject vehicle and the object;

offset value setting means for setting an initial value of detection data output from the detection means as an offset value;

subtracting means for subtracting the offset value from a non-initial value of detection data;

filter means for filtering an output from said subtracting means; and adding means for adding the offset value to an output from said filter means to provide a filtered value of physical data.

2. A radar sensor system for a vehicle according to claim 1, further comprising memory means for storing a plurality of values of detection data obtained over a predetermined period of time, and determining means for determining, when all values of detection data obtained for less than the predetermined period of time are zero, and when a new value of detection data obtained after said predetermined period of time is not zero, said new value as said initial value of detection data.

\* \* \* \* \*